(12) United States Patent
Pokharna et al.

(10) Patent No.: US 11,803,425 B2
(45) Date of Patent: Oct. 31, 2023

(54) MANAGING STORAGE RESOURCES ALLOCATED TO COPIES OF APPLICATION WORKLOADS

(71) Applicant: EMC IP Holding Company LLC, Hopkinton, MA (US)

(72) Inventors: Prashant Pokharna, Ajmer (IN); Sunil Kumar, Bangalore (IN); Shivasharan Dalasanur Narayana Gowda, Kolar (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 538 days.

(21) Appl. No.: 17/122,188

(22) Filed: Dec. 15, 2020

(65) Prior Publication Data

US 2022/0188175 A1 Jun. 16, 2022

(51) Int. Cl.
*G06F 9/50* (2006.01)
*G06F 3/06* (2006.01)
*G06F 11/14* (2006.01)
*G06F 11/36* (2006.01)

(52) U.S. Cl.
CPC .......... *G06F 9/5083* (2013.01); *G06F 3/0604* (2013.01); *G06F 3/067* (2013.01); *G06F 3/0613* (2013.01); *G06F 3/0631* (2013.01); *G06F 3/0653* (2013.01); *G06F 3/0659* (2013.01); *G06F 9/505* (2013.01); *G06F 9/5016* (2013.01); *G06F 11/1451* (2013.01); *G06F 11/3688* (2013.01); *G06F 11/3692* (2013.01); *G06F 9/50* (2013.01)

(58) Field of Classification Search
None
See application file for complete search history.

(56) References Cited

U.S. PATENT DOCUMENTS

| | | | |
|---|---|---|---|
| 9,880,757 B1* | 1/2018 | Banerjee | G06F 3/0619 |
| 10,191,778 B1* | 1/2019 | Yang | G06F 11/301 |
| 10,587,694 B1 | 3/2020 | Kumar | |
| 10,725,965 B1* | 7/2020 | Rokicki | G06F 16/00 |

(Continued)

OTHER PUBLICATIONS

Lindner et al., "Towards Automated Business-driven Indication and Mitigation of VM Sprawl in Cloud Supply Chains", 2011, IEEE International Workshop on Business Driven IT Management. (Year: 2011).*

(Continued)

*Primary Examiner* — Qing Yuan Wu
(74) *Attorney, Agent, or Firm* — Ryan, Mason & Lewis, LLP (57) ABSTRACT

An apparatus comprises at least one processing device comprising a processor coupled to a memory. The at least one processing device is configured to select an application workload running on a storage system, and to identify one or more copies of the application workload running on the storage system. The at least one processing device is also configured to determine an amount of storage resources of the storage system to allocate to the identified one or more copies of the application workload running on the storage system. The at least one processing device is further configured to allocate a portion of the determined amount of storage resources of the storage system to each of the identified one or more copies of the application workload.

20 Claims, 10 Drawing Sheets

(56) References Cited

U.S. PATENT DOCUMENTS

| | | |
|---|---|---|
| 2015/0142750 A1 | 5/2015 | Mutalik et al. |
| 2016/0092535 A1 | 3/2016 | Kuchibhotla et al. |

OTHER PUBLICATIONS

Databarracks, "What is Copy Data Management?" https://www.databarracks.com/blog/what-is-copy-data-management, Nov. 14, 2019, 3 pages.

IBM, "IBM Spectrum Copy Data Management," IBM Systems Data Sheet, May 2017, 4 pages.

Dell Technologies, "AppSync: Enabling Integrated Copy Data Management for Dell EMC All Flash Storage Arrays," Data Sheet, 2020, 3 pages.

K. Macomber, "What is Next-Generation Copy Data Management?" https://storageswiss.com/2019/05/29/what-is-next-generation-copy-data-management/, May 29, 2019, 4 pages.

\* cited by examiner

MANAGING STORAGE RESOURCES ALLOCATED TO COPIES OF APPLICATION WORKLOADS

FIELD

The field relates generally to information processing, and more particularly to storage in information processing systems.

BACKGROUND

Storage systems may be used to execute various application workloads. The application workloads may include one or more primary application workloads as well as one or more secondary application workloads. A primary application workload, for example, may be associated with a production application while the secondary application workloads comprise copies that access data of the production application. In some cases, a single primary application workload may have multiple associated secondary application workloads or application copies. Increase in the number of secondary application workloads, also referred to as application copy sprawl, may affect the performance of storage systems.

SUMMARY

Illustrative embodiments of the present disclosure provide techniques for managing storage resources allocated to copies of application workloads.

In one embodiment, an apparatus comprises at least one processing device comprising a processor coupled to a memory. The at least one processing device is configured to perform the steps of selecting an application workload running on a storage system, identifying one or more copies of the application workload running on the storage system, determining an amount of storage resources of the storage system to allocate to the identified one or more copies of the application workload running on the storage system, and allocating a portion of the determined amount of storage resources of the storage system to each of the identified one or more copies of the application workload.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
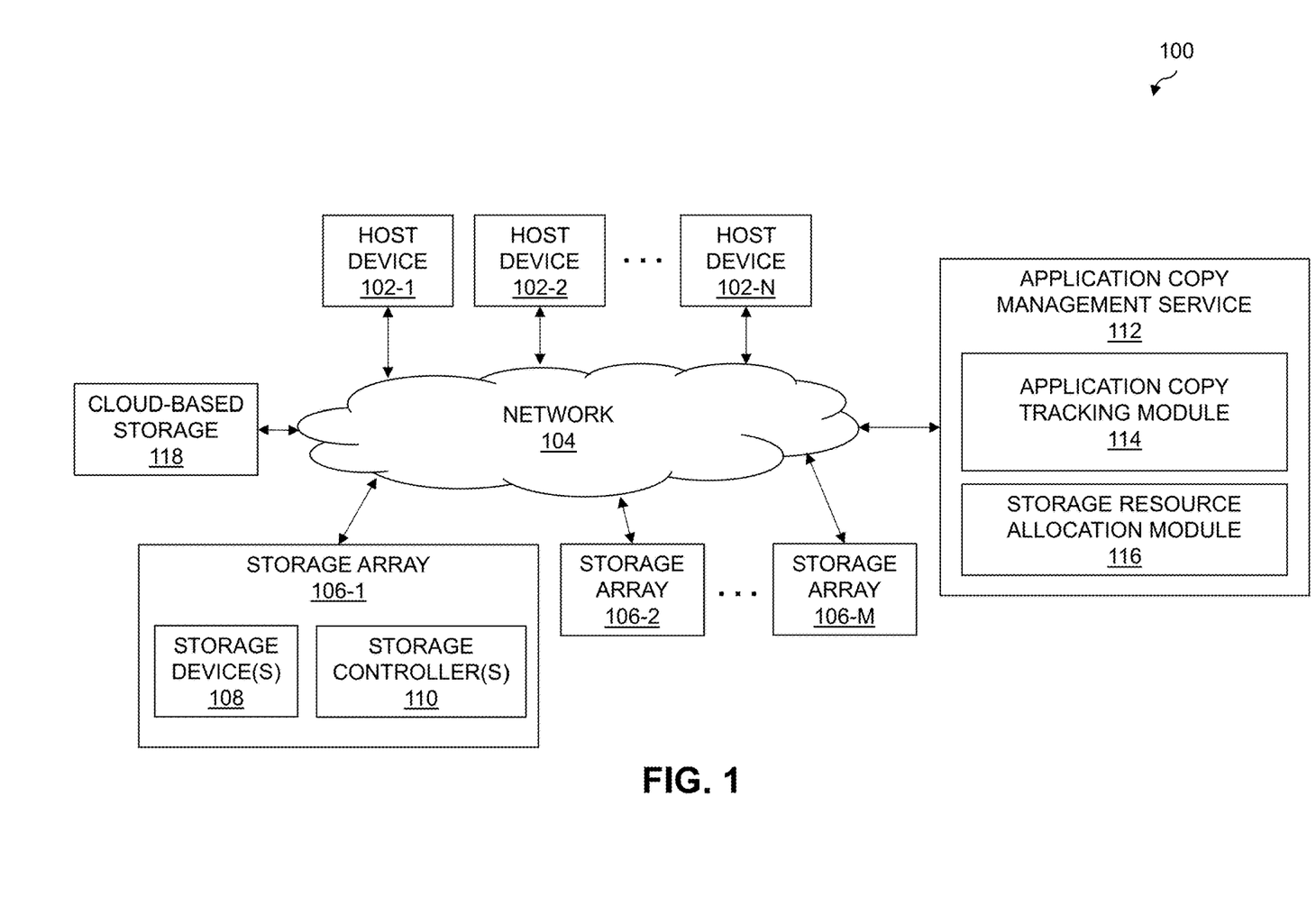
FIG. 1 is a block diagram of an information processing system for managing storage resources allocated to copies of application workloads in an illustrative embodiment.

FIG. 1 shows an information processing system 100 configured in accordance with an illustrative embodiment to manage storage resources that are allocated to copies of application workloads. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, the host devices 102 are assumed to access one or more storage volumes provided by the storage arrays 106. Storage volumes provided by the storage devices of one or more of the storage arrays 106 may be grouped to provide one or more virtual volumes that are accessed by the host devices 102. The information processing system 100 further includes an application copy management service 112 that is configured to provide functionality for managing storage resources allocated to different copies of application workloads of the host devices 102 that run on the storage arrays 106. The term "application workload" as used herein is intended to be construed broadly. For example, applications may run on one or more of the host devices 102, and generate IO operations that are sent to one or more of the storage arrays 106. Thus, an application workload includes an IO workload that is generated by one or more applications running on one or more of the host devices 102. When describing an application workload that "runs" or otherwise operates on a storage system, this should be understood to include arrangements wherein the storage system includes one or more of the host devices 102 that run an application and send IO workloads for that application to one or more of the storage arrays 106.

The application copy management service 112 includes an application copy tracking module 114 and a storage resource allocation module 116. The application copy tracking module 114 is configured to track when application copies are created and mounted on the storage arrays 106. For a given primary application workload (e.g., a production application), the application copy tracking module 114 will track when secondary application workloads (e.g., copies of the production application, also referred to as recovered applications) are created and mounted on the storage arrays 106. In some embodiments, the application copy tracking module 114 tracks application copies that are created and mounted on the same storage array (e.g., storage array 106-1) as the production application. In other embodiments, the application copy tracking module 114 may track application copies that are created and mounted on both the storage array that runs the production application (e.g., storage array 106-1) and application copies that are created and mounted on other ones of the storage arrays (e.g., storage array 106-2 through 106-M) and possibly cloud-based storage 118.

The storage resource allocation module 116 is configured to manage storage resources that are assigned to the application copies. For example, each primary application workload or production application may be assigned a designated amount of storage resources (e.g., in terms of quality of service (QoS) metrics such as input-output operations per second (IOPS)). The designated amount of storage resources for a given primary application workload or production application may be divided amongst the secondary application workloads or application copies for the given primary application workload or production application. In some embodiments, the designated amount of storage resources may be evenly divided among the secondary application workloads or application copies for the given production application. In other embodiments, the designated amount of storage resources may be unevenly divided among the secondary application workloads or application copies for the given primary application workload or production application (e.g., in accordance with weights or priorities assigned to the different secondary application workloads or application copies for the given primary application workload or production application).

In some embodiments, the application copy management service 112 is utilized by storage administrators or other authorized users (e.g., users operating the host devices 102). The storage administrators or other users can manage which primary application workloads or production applications are managed using the application copy management service 112, as well as the particular amounts of storage resources to assign to different primary application workloads or production applications, weights or priorities to assign to different secondary application workloads or application copies of each of the primary application workloads or production applications, etc.

At least portions of the functionality of the application copy tracking module 114 and storage resource allocation module 116 may be implemented at least in part in the form of software that is stored in memory and executed by a processor.

Although shown as external to the host devices 102 and storage arrays 106 in the FIG. 1 embodiment, it should be appreciated that the application copy management service 112 in other embodiments may be implemented at least in part internal to one or more of the host devices 102 and/or one or more of the storage arrays 106 (e.g., such as on the storage controllers 110 of storage array 106-1).

The host devices 102, storage arrays 106 and application copy management service 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and the application copy management service 112 may be implemented on respective distinct processing platforms, although numerous other arrangements are possible. For example, in some embodiments at least portions of one or more of the host devices 102, the storage arrays 106 and the application copy management service 112 are implemented on the same processing platform. The application copy management service 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D Point™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random-access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the application copy management service 112 may be implemented at least in part in the first geographic location, the second geographic location, and one or more other geographic locations. Thus, it is possible in some implementations of the system 100 for different ones of the host devices 102, the storage arrays 106 and the application copy management service 112 to reside in different data centers.

Numerous other distributed implementations of the host devices 102, the storage array 106 and the application copy management service 112 are possible. Accordingly, the host devices 102, the storage array 106 and the application copy management service 112 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 for managing storage resources allocated to copies of application workloads is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for managing storage resources allocated to copies of application workloads will now be described in more detail with reference to the flow diagram of FIG. 2. It is to be understood that this particular process is only an example, and that additional or alternative processes for managing storage resources allocated to copies of application workloads may be used in other embodiments.

In this embodiment, the process includes steps 200 through 206. These steps are assumed to be performed by the application copy management service 112 utilizing the application copy tracking module 114 and the storage resource allocation module 116. The process begins with step 200, selecting an application workload running on a storage system (e.g., on one of the storage arrays 106). In step 202, one or more copies of the application workload running on the storage system are identified. The application workload running on the storage system may comprise a production application, and the identified one or more copies of the application workload may comprise one or more secondary workloads that access application data of the production application. A given one of the one or more secondary workloads may access application data of the production application for at least one of: running analytics and reporting for the production application; testing of the production application; patch verification for the production application; and forensic auditing of the production application. A given one of the one or more copies of the application workload may comprise a point-in-time copy of production data of the application workload, where the point-in-time copy of the production data of the application workload may comprise one of a snapshot, a clone, and a split-mirror of the application workload. In some embodiments, the application workload and the identified one or more copies of the application workload run on a same storage array of the storage system (e.g., storage array 106-1). In other embodiments, the application workload runs on a first storage array of the storage system (e.g., storage array 106-1), and at least one of the identified one or more copies of the application workload runs on a second storage array of the storage system (e.g., storage array 106-2).

Figure 2:
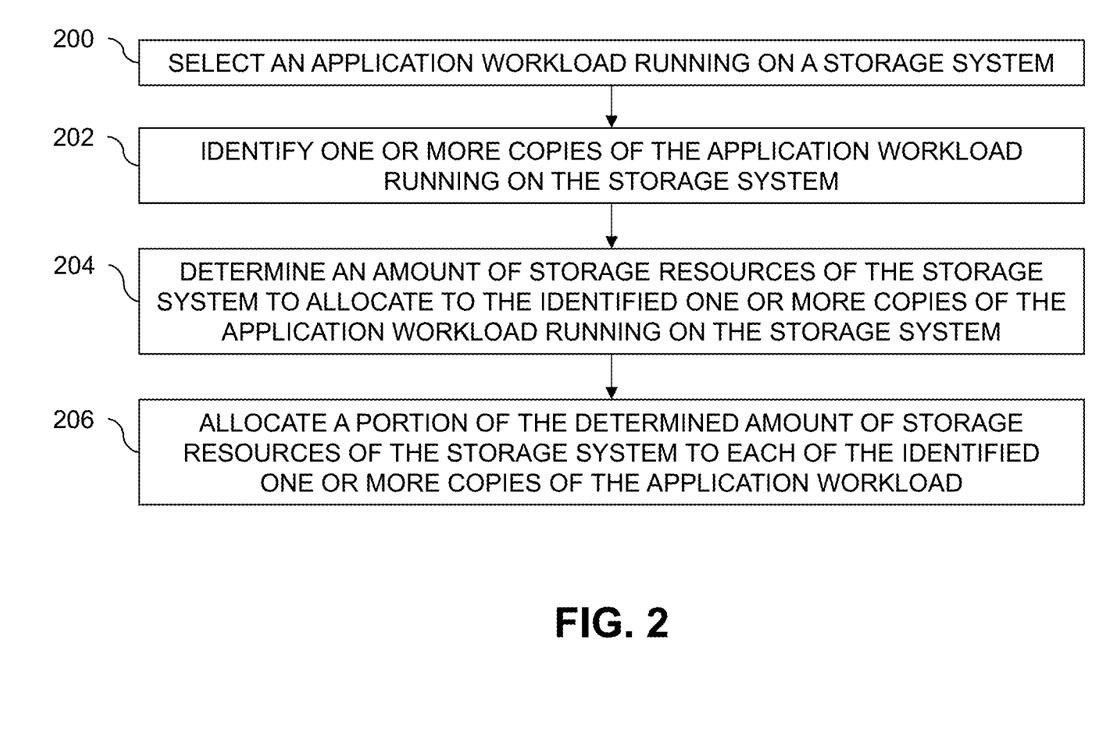
FIG. 2 is a flow diagram of an exemplary process for managing storage resources allocated to copies of application workloads in an illustrative embodiment.

The FIG. 2 process continues with step 204, determining an amount of storage resources of the storage system to allocate to the identified one or more copies of the application workload running on the storage system. In step 206, a portion of the determined amount of storage resources of the storage system is allocated to each of the identified one or more copies of the application workload. Step 204 may include determining one or more QoS metrics to allocate to the identified one or more copies of the application workload running on the storage system. The one or more QoS metrics may comprise a total amount of IOPS to be allocated to the identified one or more copies of the application workload running on the storage system.

In some embodiments, the identified one or more copies of the application workload comprise two or more copies of the application workload. Step 206 may include allocating equal portions of the determined amount of storage resources to each of the two or more copies of the application workload. Step 206 may alternatively include allocating different-sized portions of the determined amount of storage resources to each of the two or more copies of the application workload based at least in part on priorities assigned to each of the two or more copies of the application workload.

The application workload may utilize two or more storage volumes of the storage system, and each of the identified one or more copies of the application workload may comprise snapshots of the two or more storage volumes of the storage system. Step 206 may include allocating parts of the portion of the determined amount of storage resources to the snapshots of the two or more storage volumes of the storage system.

The FIG. 2 process may further include monitoring mounting and unmounting of respective ones of the identified one or more copies of the application workload on the storage system, and dynamically updating the allocation of the portion of the determined amount of storage resources to each of the identified one or more copies of the application workload based at least in part on the monitoring of mounting and unmounting of respective ones of the identified one or more copies of the application workload on the storage system. For example, when a given one of the identified one or more copies of the application workload is mounted, it may be allocated a portion of the determined amount of storage resources. The value of the portion of the determined amount of storage resources will be dynamically calculated based on the total number of copies that are currently mounted on the storage system. As another example, when a given one of the identified one or more copies of the application workload is unmounted, any portion of the determined amount of storage resources that were previously allocated to the given copy of the application workload may be released and allocated to other ones of the identified one or more copies of the application workload that are currently mounted on the storage system.

In any production application deployment on an enterprise grade storage system, there may be multiple "secondary" application workloads that need to access application data for a "primary" application workload. Such secondary application workloads may use the application data of the primary application workload for various use cases, including but not limited to running analytics and reporting, testing and development systems, patch verification, forensics, etc.

Secondary application workloads may be provided with a copy of the primary application workload by creating several point-in-time copies of production data of the primary application workload on the storage system. Storage systems offer point-in-time copies in form of snapshots, clones, split-mirror technologies, etc. Some of the secondary application workloads may run on the same storage system where the primary application workload (e.g., the production application) is also running. In cases where multiple secondary application workloads are running that are utilizing the primary application workload data, it is common to observe production application QoS getting impacted as the secondary application workload sprawl starts.

To maintain the production application QoS, and prevent it from being impacted due to secondary application workload sprawl (e.g., application copy sprawl), it is important to control the allocation of storage resources to the secondary application workloads. Illustrative embodiments provide techniques for dynamically allocating appropriate storage resources to the application copies so that the production application QoS is not impacted, irrespective of the number of application copies running on the same storage system.

Figure 3:
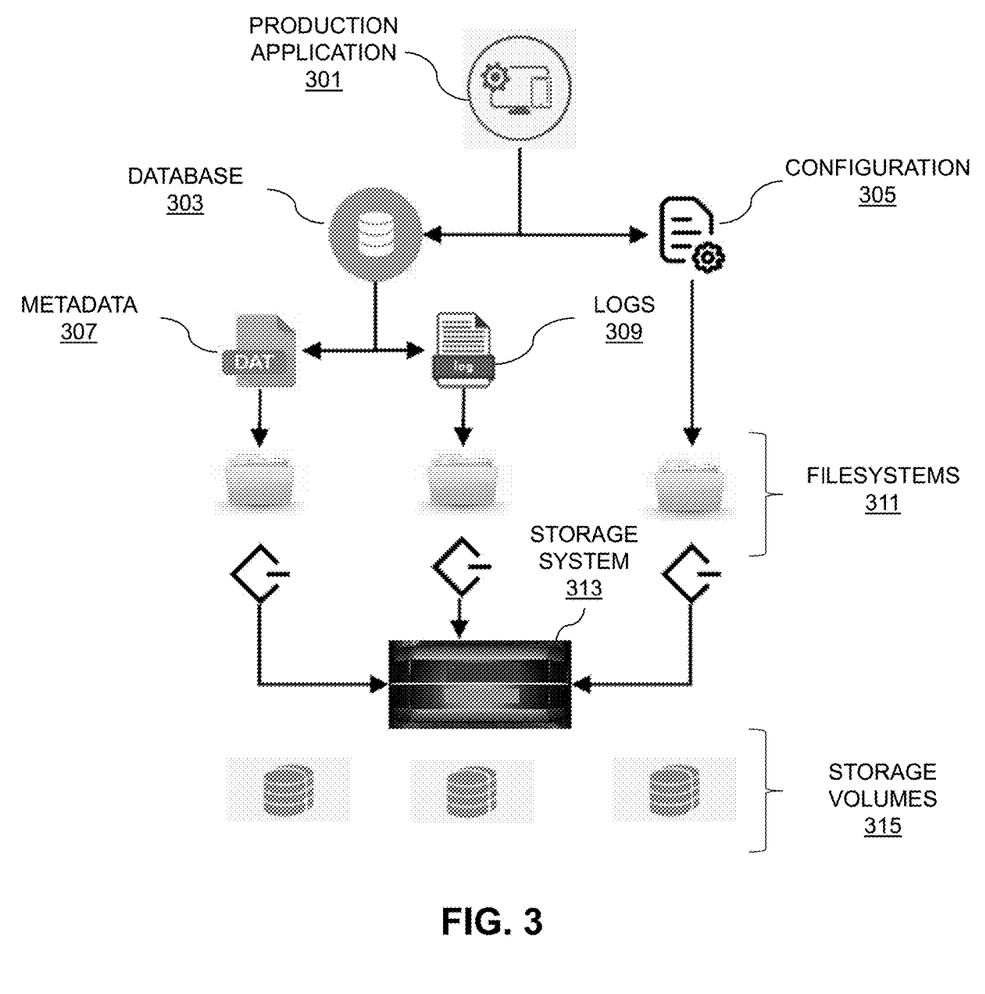
FIG. 3 shows an architecture of an application workload running on a host storage system in an illustrative embodiment.

In some embodiments, usage of the production application copies created on the storage system is tracked, and storage resource allocation to the application copies is dynamically adjusted when the active use of respective ones of the application copies starts. To do so, underlying storage system provided QoS capabilities are utilized on individual storage volumes to limit, for example, IOPS. A solution may involve developing new copy data management (CDM) tools, or modifying existing CDM tools to provide the functionality described herein. The CDM tools are configured with the capability to decompose a production application instance and generate a complete mapping information of the lowest level storage volume information. For example, the CDM tools may be configured to convert an application or database instance information to the host filesystem→host volume group→host physical device→hypervisor filesystem→hypervisor physical device→storage system volume (LUN) and consistency group information. FIG. 3 shows an example architecture, including a production application 301, a database 303 and configuration 305, metadata 307 and logs 309, multiple filesystems 311, a storage system 313 and storage volumes 315.

The CDM tools may also be configured to create multiple copies of the production application for the different secondary application workload use cases. If the same CDM tools are used to generate copies, then the CDM tools need to catalog all the application copy information including the detailed application copy layout information. This may include all the application data and log volumes, point-in-time copy information associated with different pieces of application data (e.g., in short, saving the application copy tree information), etc. If different CDM tools are used, or if other backup and data management tools are used to generate the point-in-time copy information, then the CDM tools need to track all the new point-in-time copies created for all the mapped storage volumes. Once creation of a new copy is detected for the application mapped volumes, the tools will catalog the information as the new application copy in its internal catalog system.

The CDM or other tools are configured to enable the administrator of a storage system to specify the maximum amount of storage resources allocated for the application copy sprawl of a production or primary application. It should be noted that the maximum amount of storage resources may be for the entire copy workload (e.g., all of the secondary application workloads collectively for a primary application workload) rather than for any single one of the application copies. Once the application copies are masked to the storage system, an algorithm is used to apply appropriate QoS on each of the application copies to control the overall QoS of the application copy sprawl.

Figure 4:
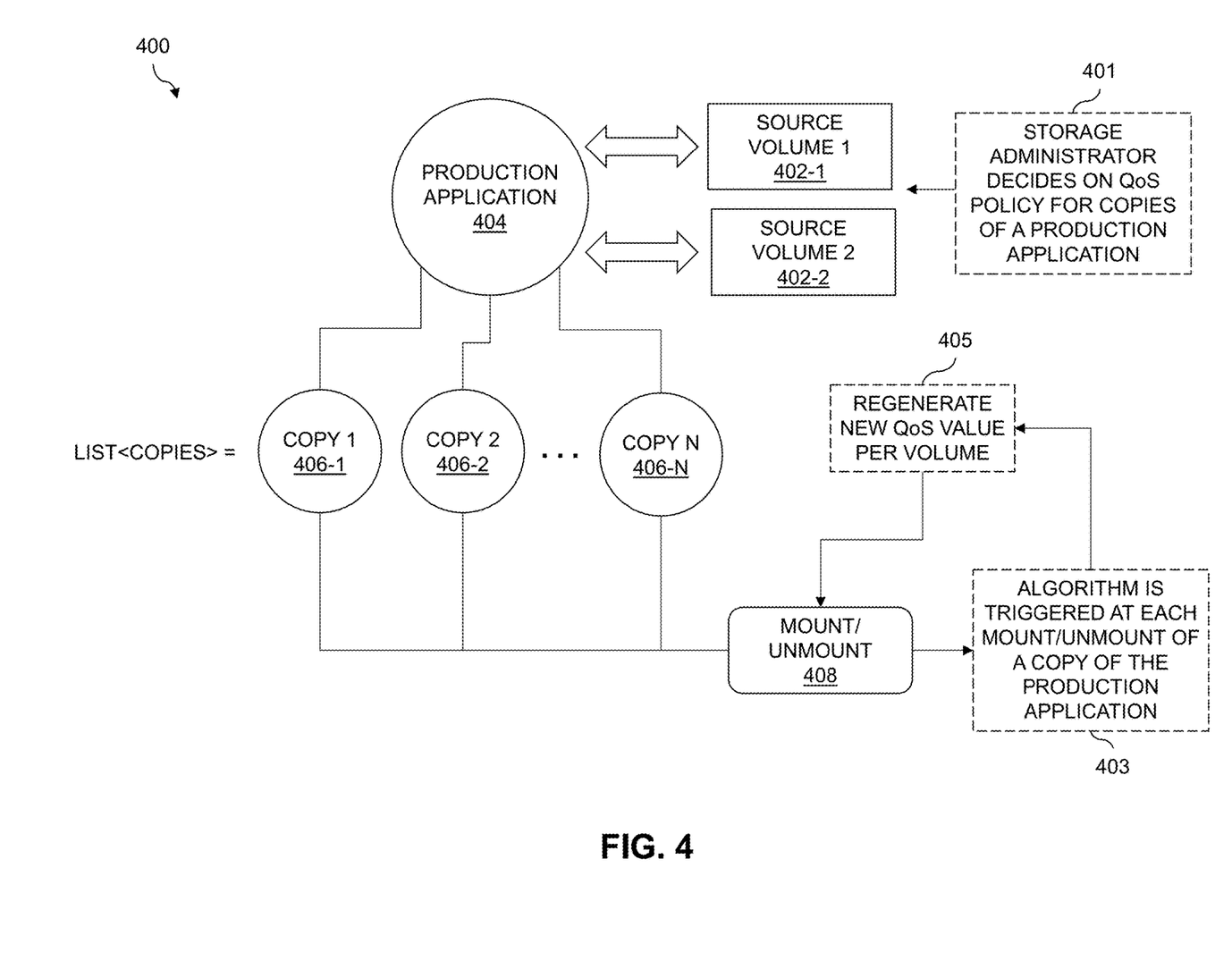
FIG. 4 shows an algorithm for dynamically assigning storage resources to copies of application workloads in an illustrative embodiment.

FIG. 4 illustrates an algorithm 400 for dynamically assigning storage resources to copies of application workloads. A set of source storage volumes 402-1 and 402-2 (collectively, source storage volumes 402) are used for a production application 404 (e.g., a production database), which has a set of application copies 406-1, 406-2, . . . 406-N (collectively, application copies 406). The application copies 406 are subject to various mount and unmount operations 408. In step 401, a storage administrator decides on a QoS policy for the application copies 406 of the production application 404. Each mount or unmount operation 408 triggers the algorithm 400 in step 403, which will regenerate or re-calculate the new QoS value per volume in step 405 and assign storage resources accordingly.

The list of application copies 406 is saved in an array. Whenever a new copy is created or an existing copy is deleted, the list of copies is updated. Whenever a CDM or other tool handles a mount or unmount operation 408, the algorithm triggers in step 403 where the input is the list of copies. The QoS policy specified in step 401 is then used to dynamically update a QoS value in step 405 that is used for all of the application copies 406. Consider, as an example, a storage administrator that sets a value of 1000 IOPS for the production application 404 with two source volumes 402. If the CDM creates and mounts copy 406-1 with two snapshots, both the snapshots will then get 500 IOPS as per the algorithm 400. If the CDM then creates and mounts copy 406-2 (with two snapshots), the 1000 IOPS will be divided by four and hence all the snapshots will be allocated 250 IOPS. If the CDM then unmounts copy 406-1, the algorithm 400 triggers and the effective mounted snapshots is two (for the mounted copy 406-2), and the IOPS will reset to 500 IOPS per snapshot (e.g., 1000 IOPS divided by two).

Figure 5A:
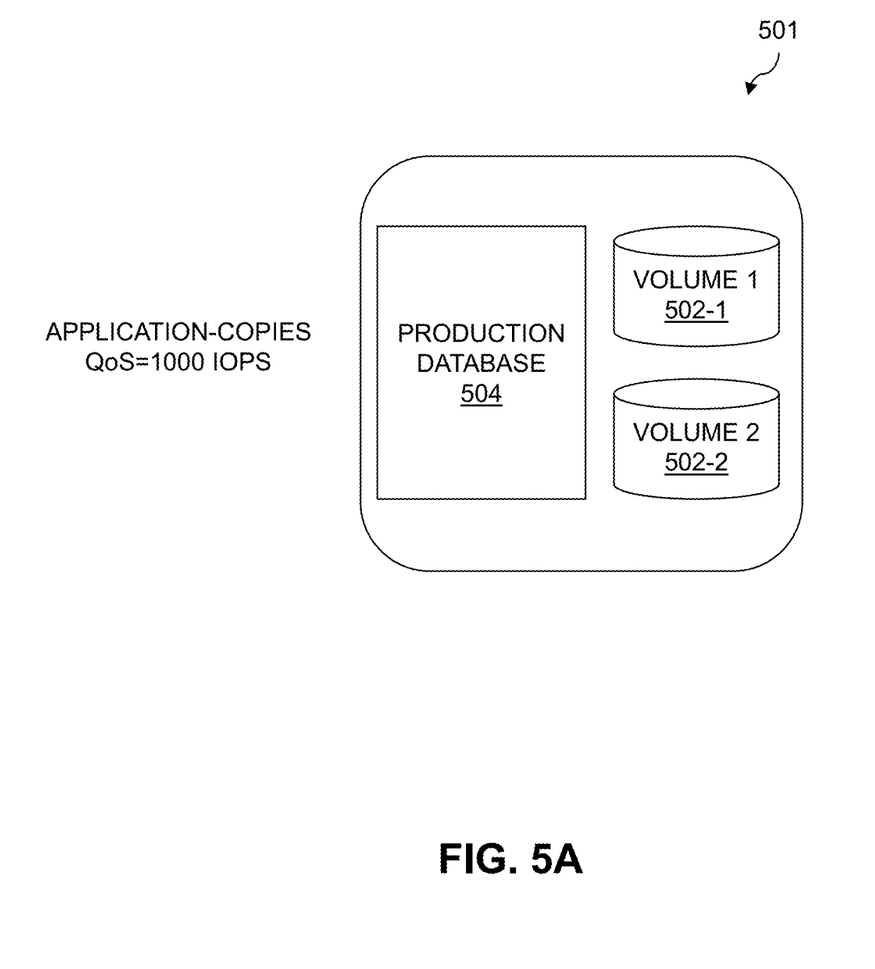
FIGS. 5A-5D show views of dynamic assignment of storage resources to application copies and their associated snapshots in an illustrative embodiment.
Figure 5B:
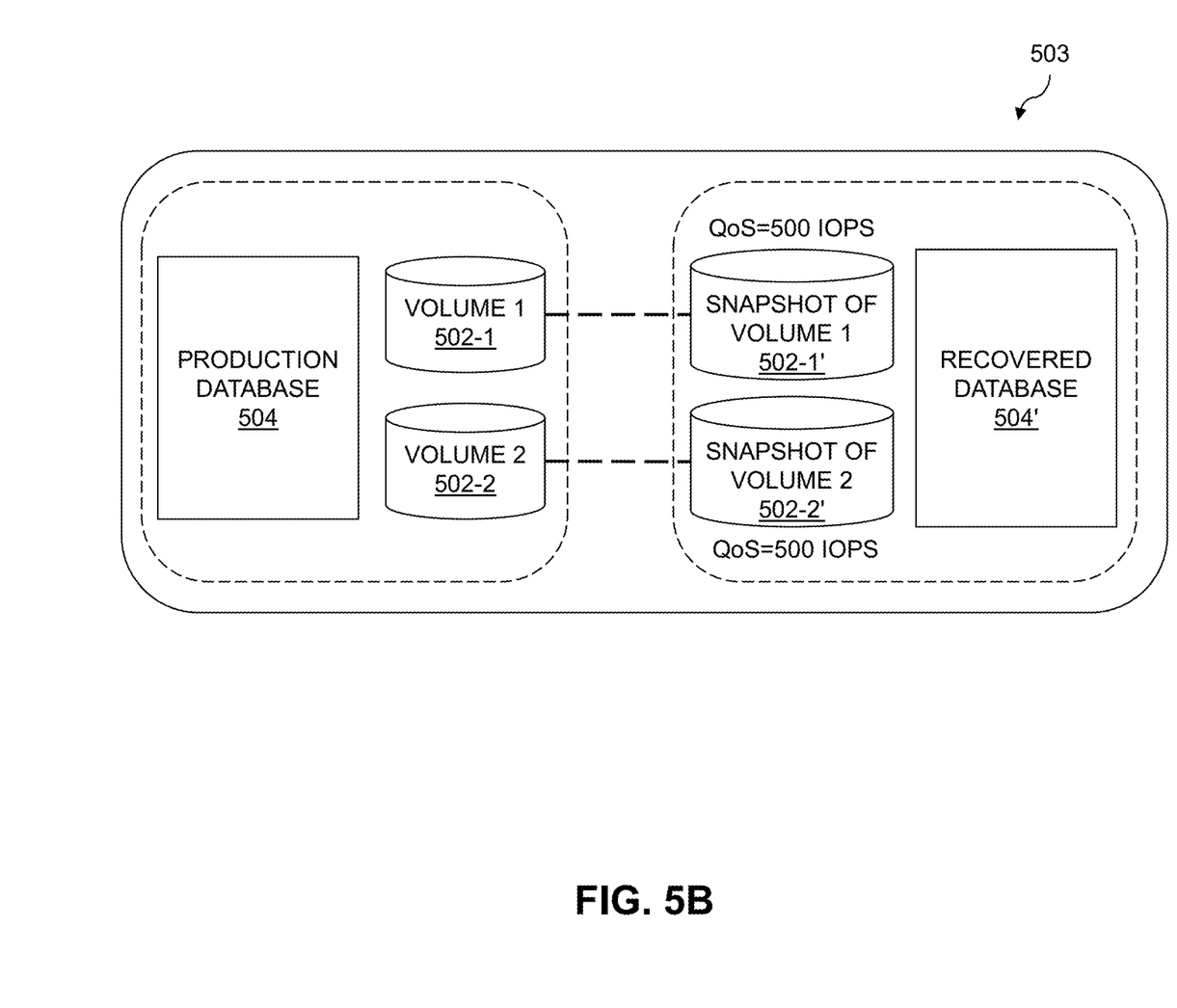
Figure 5C:
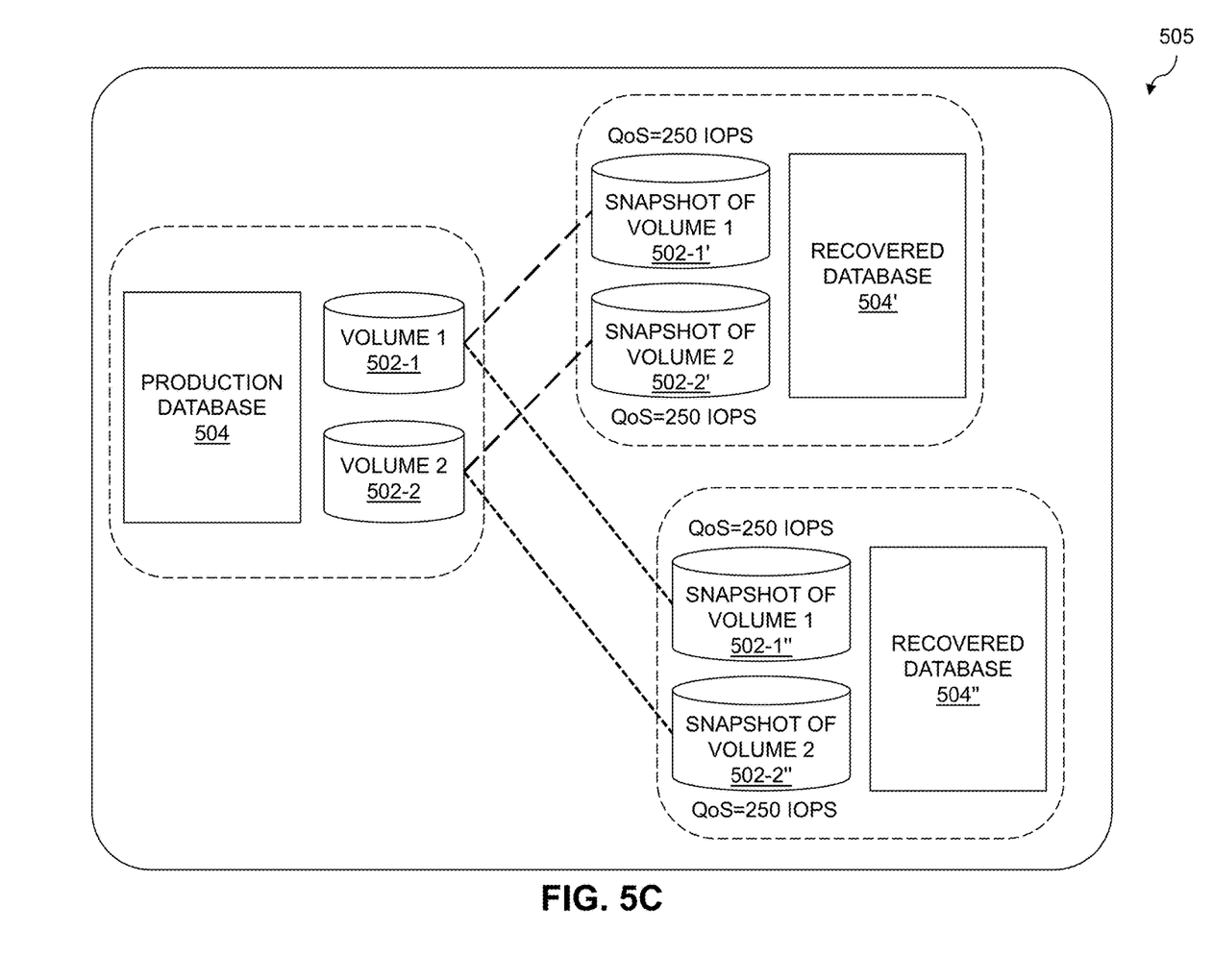
Figure 5D:
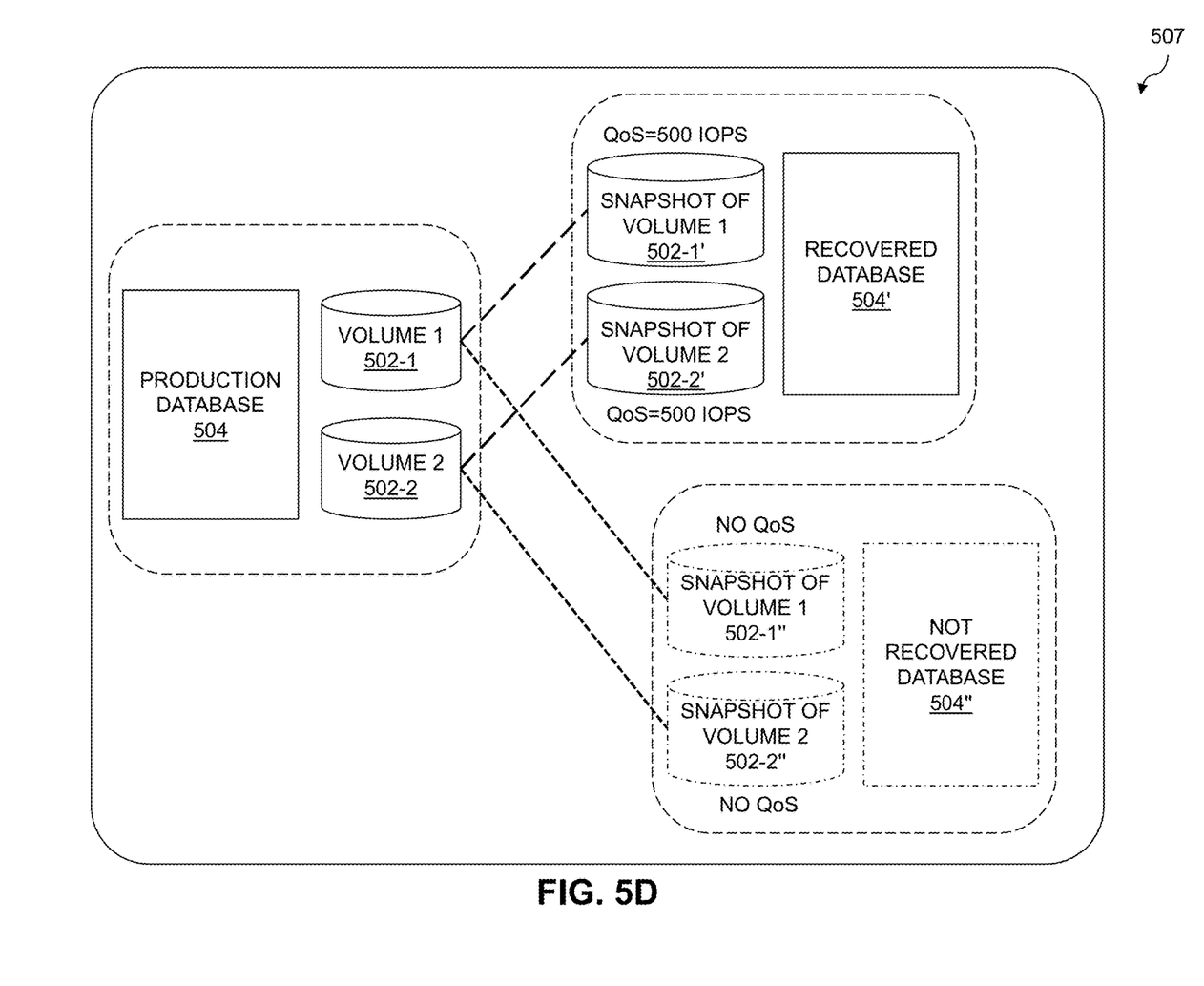

FIGS. 5A-5D illustrate application of the algorithm 400, where the application-copies QoS set in step 401 is 1000 IOPS. FIG. 5A shows a view 501 of a production database 504 with two associated storage volumes 502-1 and 502-2 (collectively, storage volumes 502). FIG. 5B shows a view 503 when a first application copy is created and mounted as recovered database 504', with snapshots 502-1' and 502-2' of storage volumes 502-1 and 502-2. In this example, each of the snapshots 502-1' and 502-2' are allocated QoS of 500 IOPS. FIG. 5C shows a view 505 when a second application copy is created and mounted as recovered database 504'', with snapshots 502-1'' and 502-2'' of storage volumes 502-1 and 502-2. In this example, each of the snapshots 502-1', 502-2', 502-1'' and 502-2'' are allocated QS of 250 IOPS. FIG. 5D shows a view 507 when the second application copy is unmounted and is thus represented as an un-recovered database 504''. Accordingly, the snapshots 502-1'' and 502-2'' are not allocated any QoS, and the snapshots 502-1' and 502-2' are allocated QoS of 500 IOPS each.

It should be noted that while FIGS. 4 and 5A-5D describe an example where the total application-copies QoS is evenly divided among the application copies and their associated snapshots, this is not a requirement. In other embodiments, the application-copies QoS may be unevenly divided among the application copies and their associated snapshots, such as in accordance with weight values assigned to the different application copies and their associated snapshots. Weights or priorities for the different application copies or secondary workloads may be assigned automatically, by a user, etc.

The techniques described herein for managing storage resources allocated to copies of application workloads provide various advantages. For example, such techniques enable users to have more control over QoS for application workloads running on storage systems. Such control may be implemented through automatic scaling of QoS (e.g., IOPS) that is assigned to secondary workloads or application copies as such application copies are created and mounted and unmounted. The automatic scaling may be further tweaked such that certain desired application copies and their associated snapshots get more or less QoS (e.g., IOPS) on-the-fly based on weights or priorities assigned to the different application copies and their associated snapshots.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for managing storage resources allocated to copies of application workloads will now be described in greater detail with reference to FIGS. 6 and 7. Although described in the context of system 100, these platforms may also be used to implement at least portions of other information processing systems in other embodiments.

Figure 6:
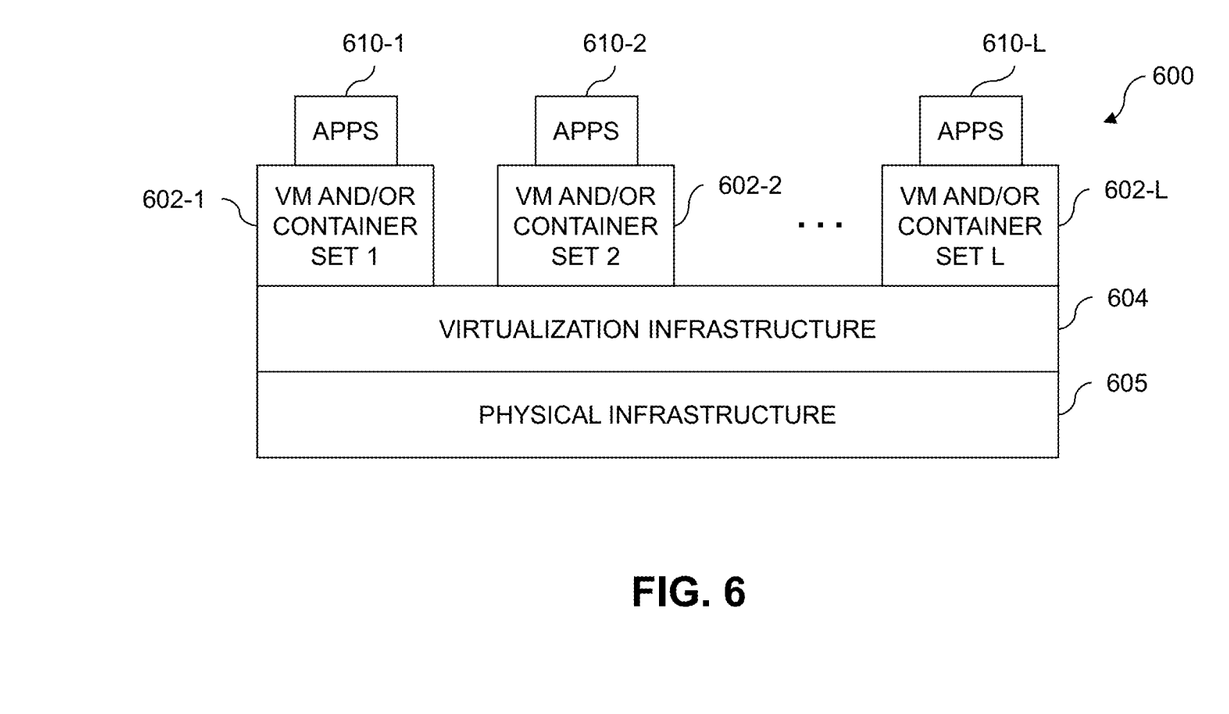
FIGS. 6 and 7 show examples of processing platforms that may be utilized to implement at least a portion of an information processing system in illustrative embodiments.
Figure 7:
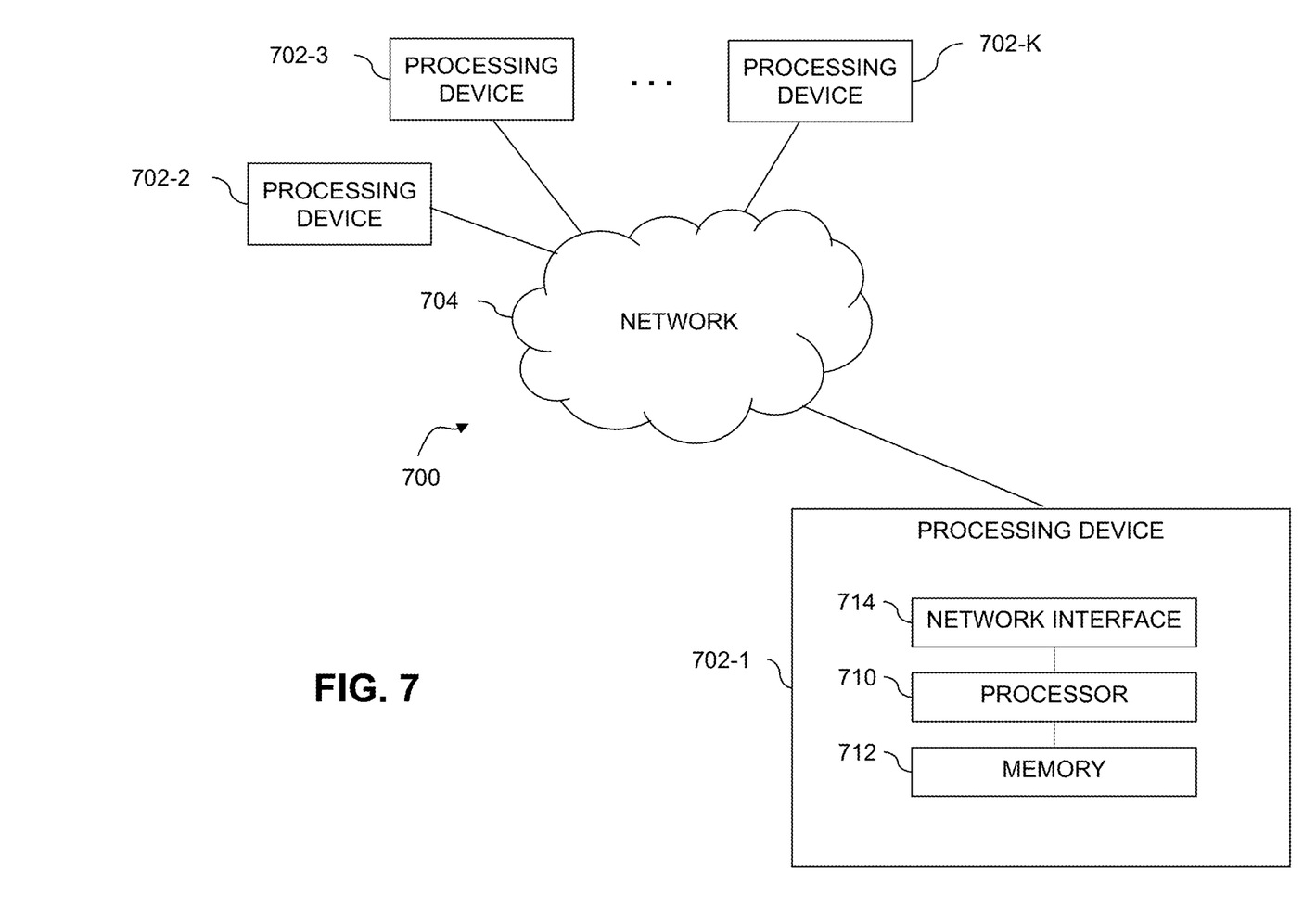

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing storage resources allocated to copies of application workloads as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, application workloads, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   selecting an application workload running on a storage system;
   identifying one or more copies of the application workload running on the storage system;
   determining an amount of storage resources of the storage system to allocate to the identified one or more copies of the application workload running on the storage system; and
   allocating a portion of the determined amount of storage resources of the storage system to each of the identified one or more copies of the application workload.

2. The apparatus of claim 1 wherein the application workload running on the storage system comprises a production application, and wherein the identified one or more copies of the application workload comprise one or more secondary workloads that access application data of the production application.

3. The apparatus of claim 2 wherein a given one of the one or more secondary workloads accesses application data of the production application for at least one of:
   running analytics and reporting for the production application;
   testing of the production application;
   patch verification for the production application; and
   forensic auditing of the production application.

4. The apparatus of claim 1 wherein a given one of the one or more copies of the application workload comprises a point-in-time copy of production data of the application workload.

5. The apparatus of claim 4 wherein the point-in-time copy of the production data of the application workload comprises one of a snapshot, a clone, and a split-mirror of the application workload.

6. The apparatus of claim 1 wherein determining the amount of the storage resources of the storage system to allocate to the identified one or more copies of the application workload running on the storage system comprises determining one or more quality of service metrics to allocate to the identified one or more copies of the application workload running on the storage system.

7. The apparatus of claim 6 wherein the one or more quality of service metrics comprise a total amount of input-output operations per second to be allocated to the identified one or more copies of the application workload running on the storage system.

8. The apparatus of claim 1 wherein the identified one or more copies of the application workload comprise two or more copies of the application workload, and wherein allocating the portion of the determined amount of storage resources of the storage system to each of the one or more copies of the application workload comprises allocating equal portions of the determined amount of storage resources to each of the two or more copies of the application workload.

9. The apparatus of claim 1 wherein the identified one or more copies of the application workload comprise two or more copies of the application workload, and wherein allocating the portion of the determined amount of storage resources of the storage system to each of the one or more copies of the application workload comprises allocating different-sized portions of the determined amount of storage resources to each of the two or more copies of the application workload based at least in part on priorities assigned to each of the two or more copies of the application workload.

10. The apparatus of claim 1 wherein the application workload utilizes two or more storage volumes of the storage system, and wherein each of the identified one or more copies of the application workload comprises snapshots of the two or more storage volumes of the storage system.

11. The apparatus of claim 10 wherein allocating the portion of the determined amount of storage resources to each of the identified one or more copies of the application workload comprises allocating parts of the portion of the determined amount of storage resources to the snapshots of the two or more storage volumes of the storage system.

12. The apparatus of claim 1 wherein the at least one processing device is further configured to perform steps of:
monitoring mounting and unmounting of respective ones of the identified one or more copies of the application workload on the storage system; and
dynamically updating the allocation of the portion of the determined amount of storage resources to each of the identified one or more copies of the application workload based at least in part on the monitoring of mounting and unmounting of respective ones of the identified one or more copies of the application workload on the storage system.

13. The apparatus of claim 1 wherein the application workload and the identified one or more copies of the application workload run on a same storage array of the storage system.

14. The apparatus of claim 1 wherein the application workload runs on a first storage array of the storage system, and wherein at least one of the identified one or more copies of the application workload runs on a second storage array of the storage system.

15. A computer program product comprising a non-transitory processor-readable storage medium having stored therein program code of one or more software programs, wherein the program code when executed by at least one processing device causes the at least one processing device to perform steps of:
selecting an application workload running on a storage system;
identifying one or more copies of the application workload running on the storage system;
determining an amount of storage resources of the storage system to allocate to the identified one or more copies of the application workload running on the storage system; and
allocating a portion of the determined amount of storage resources of the storage system to each of the identified one or more copies of the application workload.

16. The computer program product of claim 15 wherein determining the amount of the storage resources of the storage system to allocate to the identified one or more copies of the application workload running on the storage system comprises determining one or more quality of service metrics to allocate to the identified one or more copies of the application workload running on the storage system, the one or more quality of service metrics comprising a total amount of input-output operations per second to be allocated to the identified one or more copies of the application workload running on the storage system.

17. The computer program product of claim 15 wherein the identified one or more copies of the application workload comprise two or more copies of the application workload, and wherein allocating the portion of the determined amount of storage resources of the storage system to each of the one or more copies of the application workload comprises allocating different-sized portions of the determined amount of storage resources to each of the two or more copies of the application workload based at least in part on priorities assigned to each of the two or more copies of the application workload.

18. A method comprising:
selecting an application workload running on a storage system;
identifying one or more copies of the application workload running on the storage system;
determining an amount of storage resources of the storage system to allocate to the identified one or more copies of the application workload running on the storage system; and
allocating a portion of the determined amount of storage resources of the storage system to each of the identified one or more copies of the application workload;
wherein the method is performed by at least one processing device comprising a processor coupled to a memory.

19. The method of claim 18 wherein determining the amount of the storage resources of the storage system to allocate to the identified one or more copies of the application workload running on the storage system comprises determining one or more quality of service metrics to allocate to the identified one or more copies of the application workload running on the storage system, the one or more quality of service metrics comprising a total amount of input-output operations per second to be allocated to the identified one or more copies of the application workload running on the storage system.

20. The method of claim 18 wherein the identified one or more copies of the application workload comprise two or more copies of the application workload, and wherein allocating the portion of the determined amount of storage resources of the storage system to each of the one or more copies of the application workload comprises allocating different-sized portions of the determined amount of storage resources to each of the two or more copies of the application workload based at least in part on priorities assigned to each of the two or more copies of the application workload.

\* \* \* \* \*